Feb. 1, 1955 G. A. PEPLE, JR 2,701,101
DAMPER

Filed April 5, 1949 4 Sheets-Sheet 2

INVENTOR
GUSTAVE A. PEPLE JR. DECEASED,
BY BANK OF COMMERCE AND
TRUSTS, EXECUTOR

BY Pennie, Edmonds, Morton & Barrows
ATTORNEYS

Feb. 1, 1955 G. A. PEPLE, JR 2,701,101
DAMPER
Filed April 5, 1949 4 Sheets-Sheet 3
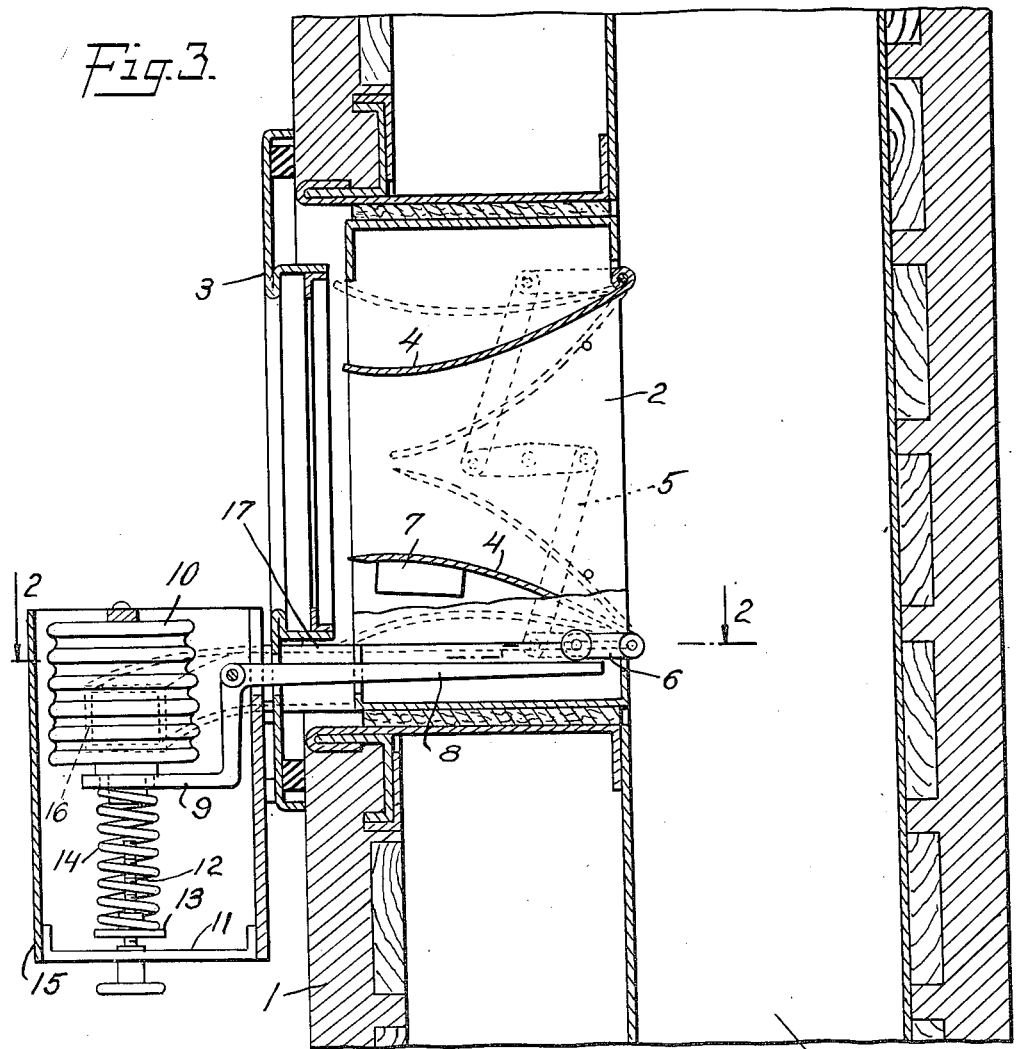
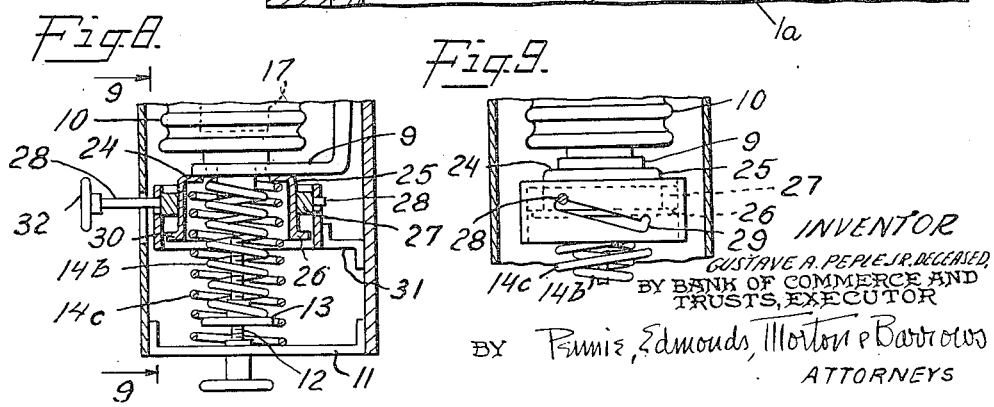
INVENTOR
GUSTAVE A. PEPLE JR, DECEASED,
BY BANK OF COMMERCE AND
TRUSTS, EXECUTOR
BY Pennie, Edmonds, Morton & Barrows
ATTORNEYS Feb. 1, 1955

G. A. PEPLE, JR 2,701,101

DAMPER

Filed April 5, 1949

INVENTOR
GUSTAVE A. PEPLE, JR, DECEASED,
BY BANK OF COMMERCE AND
TRUSTS, EXECUTOR

BY Purnie, Edmonds, Morton & Barrows

ATTORNEYS

2,701,101

DAMPER

Gustave A. Peple, Jr., deceased, late of Richmond, Va., by Bank of Commerce and Trusts, Richmond, Va., executor Application April 5, 1949, Serial No. 85,617

3 Claims. (Cl. 236—1)

This invention relates to dampers and operating means therefor for use in regulating the discharge of heated or cooled air from a duct in accordance with the temperature prevailing in the room or other space into which the cooled or heated air is discharged. More specifically, this invenion constitutes an improvement on the apparatus shown and described in Patent No. 2,487,367 dated November 8, 1949.

As pointed out in the specification of the above mentioned patent, the invention consists primarily of an apparatus wherein the power for operating the damper is obtained from the heat in the air itself, so that no power connections—electric, pneumatic or otherwise—are required for operating the damper. The apparatus of the present application operates on the same principle as that disclosed in the above mentioned patent, and the object of the present improvement is to simplify that apparatus, to reduce the cost of manufacture and to provide a single self-contained unit which in winter will regulate the admission of warm air from the duct so as to maintain at the control thermostat the desired temperature, and in summer will regulate the admission of cold air from the same duct so as to maintain at the thermostat the same desired temperature.

In the accompanying drawings is illustrated a preferred form of improved self-contained damper mechanism.

In the said drawings,

Fig. 3 is a vertical sectional view on line 3—3, Fig. 2, showing the hot air responsive mechanism installed at one end of the duct;

Fig. 8 is a sectional view showing a modified construction wherein a single damper operating mechanism is adjustable for both summer and winter operation; and Fig. 9 is a sectional view on line 9—9 of Fig. 8.

Figure 1:
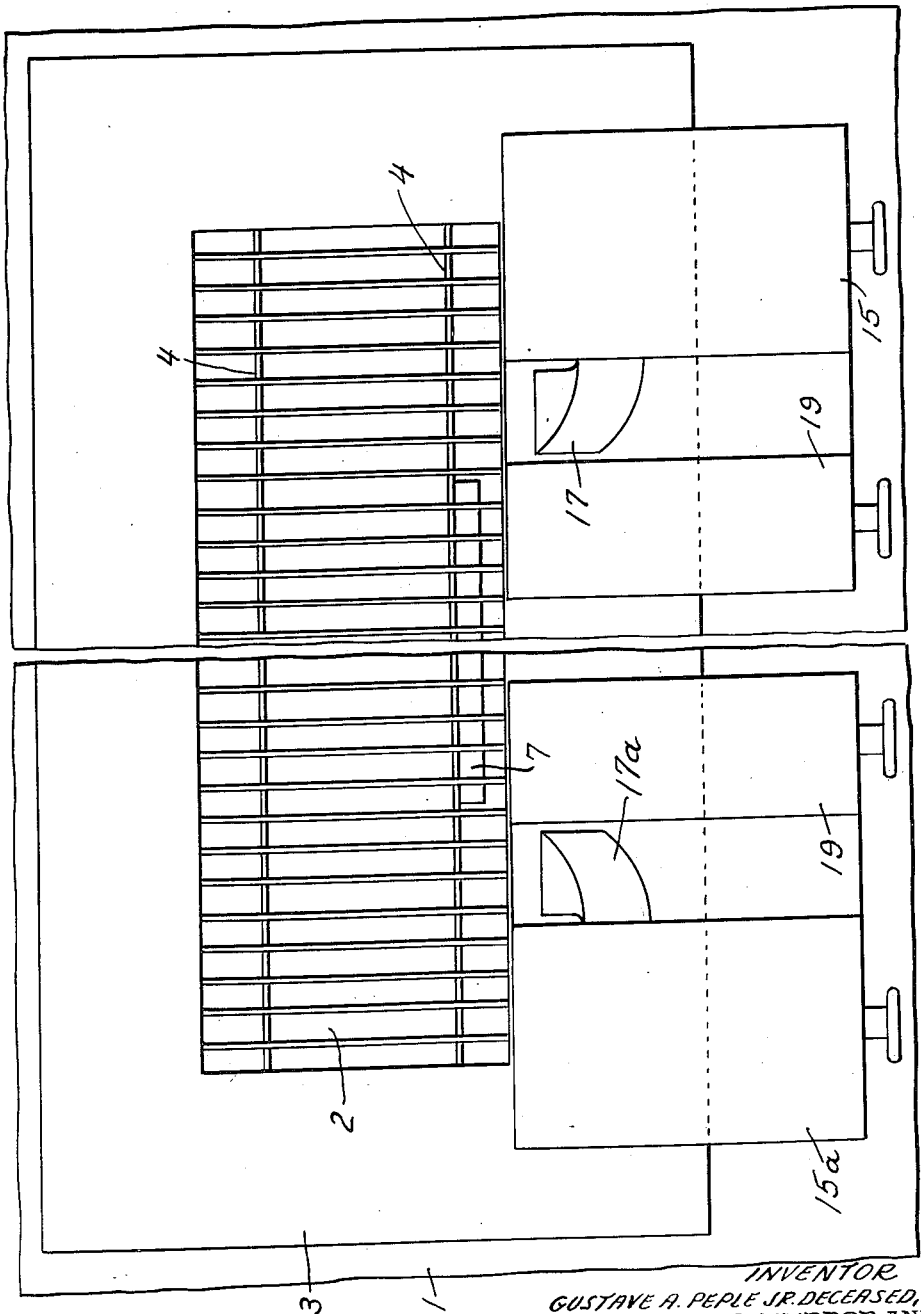
Fig. 1 is a front elevation of the improved self-contained damper mounted in the wall opening of an air duct of an air conditioning system.

Referring to the drawings, particularly to Fig. 3, 1 indicates the wall of the building having a main duct 1a leading from a source of heated or cooled air. A branch duct 2 terminates in a discharge opening in the side of the wall which forms one boundary of the room or other space whose temperature is to be regulated. The duct opening is provided with the usual grill 3 having a central opening of somewhat less area than the cross sectional area of the duct. Supported on horizontal pivots in the duct 2 adjacent the main duct are damper blades 4 which are preferably of the construction shown in prior Patent No. 2,281,615 whereby the discharged air will be maintained at a constant discharge velocity regardless of the volume discharged. The two dampers 4 are connected by a link mechanism 5 for operation in unison.

The dampers are closed by means of crank arms 6, 6a attached to the supporting shaft of the lower damper blade at each end, respectively. When the crank arms are turned in a clockwise direction as shown in Fig. 3, that is, when the free ends of the crank arms are elevated, the damper blades are closed and are opened by means of a weight 7 attached to the under side of the lower damper blade. The weight not only serves to bias the damper blade in open position but also maintains the end of the crank arm 6 in contact with an operating bell crank 8 which, as shown, is supported on a fixed pivot carried by a bracket projecting from the front face of the grill 3. The bell crank 8 is provided with a forwardly projecting horizontal extension which underlies and engages the bottom of a metal bellows 10, which is partially filled with a volatile liquid such, for example, as methyl chloride or other liquid which at normal room temperatures will maintain a pressure in a closed vessel varying directly with the surrounding temperature.

Beneath the horizontal extension 9 of the bell crank 8 is a bracket 11 on which is mounted a screw 12 which carries a collar 13 which forms the bottom for a spring 14 which engages the under side of the extension 9 and resists the expansion of the bellows with a force dependent upon the adjustment of the screw 12.

Figure 2:
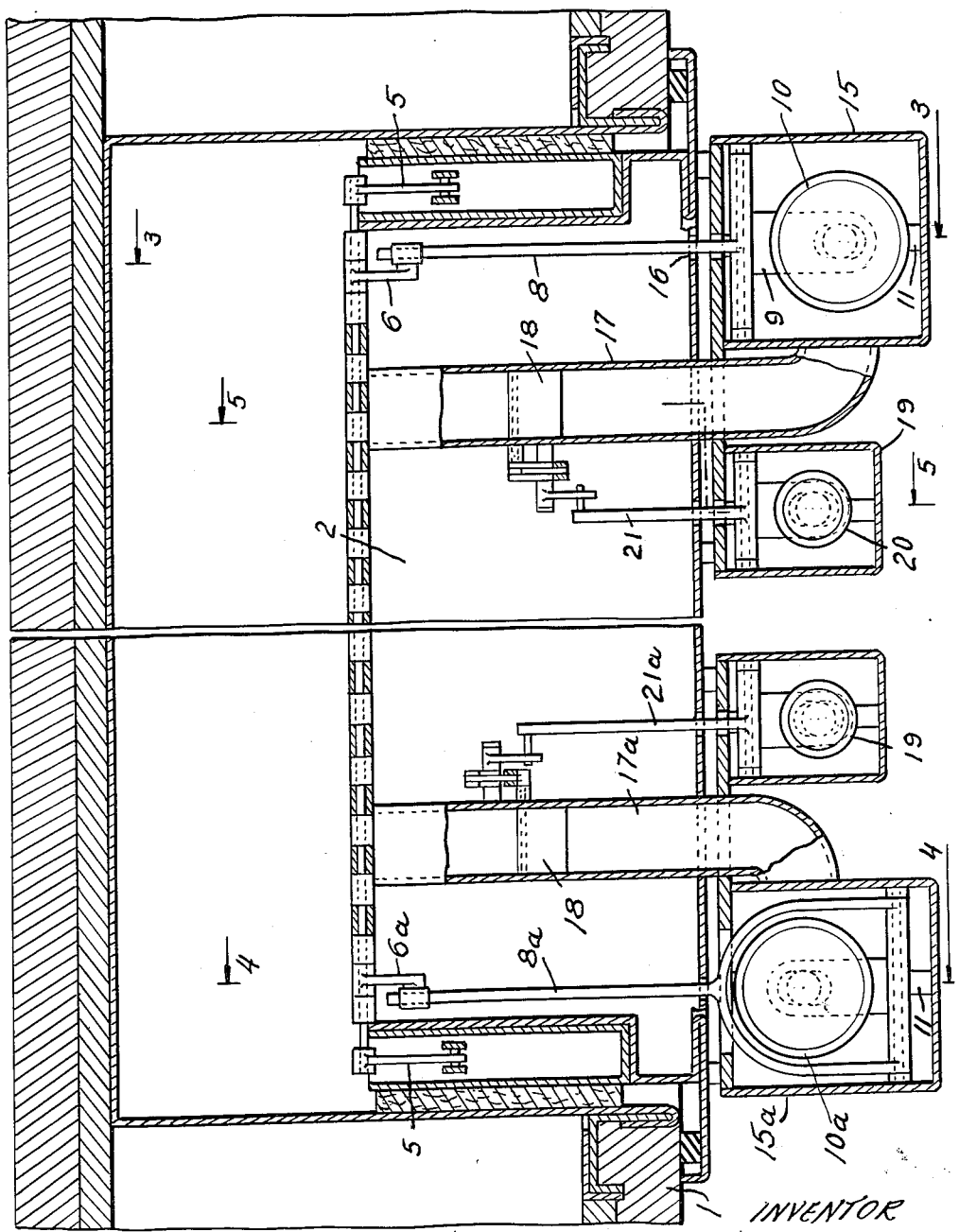
Fig. 2 is a horizontal sectional view on line 2—2 of Fig. 3 showing the thermostats and connections for controlling the damper regulating mechanism.

The bellows 10 and the bracket 11 with the attached adjusting screw and spring are enclosed in a housing 15 which is open at the top and bottom as shown, so as to provide a short duct through which air may be drawn upwardly by the aspirator effect of the air discharged through the damper from the main duct. The housing 15 extends upwardly to the top of the bellows, and in the wall of the housing adjacent the mid-portion of the bellows is a hole 16 (see Fig. 3) which forms the discharge opening of a small horizontal duct 17 formed in the bottom of the main duct, as shown in Fig. 2. The duct 17 communicates at its rear opening with the main duct so that a small portion of the air from the main duct will be discharged into the room or other closure through the small auxiliary duct 17, thence around the bellows 10 within the housing 15 and out through the top of the housing into the room.

Figure 5:
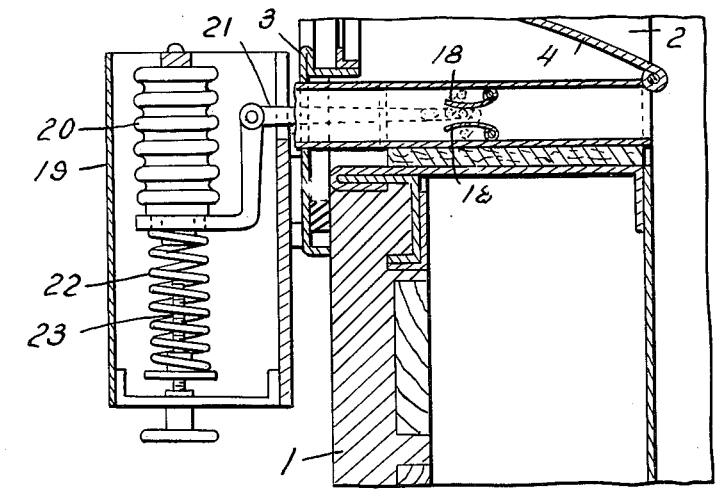
Fig. 5 is a sectional view on line 5—5 of Fig. 2 showing the room thermostat and connections.

The flow of air through the auxiliary duct 17 is controlled by means of a pair of small pilot dampers 18 (see Fig. 5) which are similar in construction to the main dampers and are positioned directly by a thermostatic bellows 20 mounted alongside the main bellows 10 in a separate housing 19 which is cut off from the discharge opening of the small duct 17 but is open at the top and bottom so that the thermostatic bellows is responsive to the temperature of the room air which is drawn upwardly from the housing 19 by the discharge of air from the main duct. The mechanism for operating the auxiliary dampers 18 by means of the thermostatic bellows 20 consists essentially of a bell crank lever 21 whose projecting end is maintained in contact with the bottom of the bellows by a regulating spring 22 whose tension may be adjusted by a screw 23.

The mechanism as above described will operate automatically to maintain the discharge of warm air from the duct in whatever volume is necessary to maintain the desired temperature in the room, and its operation will now be described. The adjusting screw on the thermostatic bellows 20 is set so that the pilot dampers 18 are partially open when the room is at the desired temperature. If the temperature of the room rises the thermostatic bellows 20 expands and causes the pilot dampers to open to a great extent, thereby increasing the volume of air discharged from the auxiliary duct 17 against the main bellows 10. This increase in volume of warm air causes the main bellows 10 to expand, thereby pressing downwardly on the extension 9 on the bell crank 8 and thereby through the medium of the crank arm 6 operating the main dampers to a more nearly closed position. This action will continue until the reduced supply of hot air reduces the room temperature sufficiently for the pilot dampers to partially close and the main bellows to contract and shift the main dampers to a more open position. In like manner, if the temperature falls in the room the thermostat tends to close the pilot dampers, thereby reducing the supply of air to the auxiliary duct with a consequent reduction in the heating effect of the main bellows 10 so that the pressure in the bellows is reduced and the bell crank 8 shifted by the spring 14 to allow the main dampers to open through the action of the weights 7.

With the apparatus above described the temperature of the room will be maintained constant within a narrow range so long as the hot air in the duct is maintained at approximately constant temperature and pressure. The apparatus can be readily adjusted to accommodate variations in duct temperature and pressure by means of the adjusting screw 12 which regulates the spring opposing the expansion of the main bellows, but it is customary in hot air heating systems to provide an automatic static pressure control to maintain the duct pressure constant and a ductstat to maintain the temperature substantially constant.

By the improved damper regulating means each room in a building served from the common duct may be individually regulated to any temperature desired within the range of the apparatus.

Figure 6:
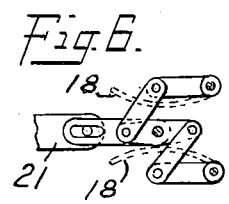
Figs. 6 and 7 are detail views showing, respectively, the pilot damper operating connections for the hot and cold air mechanisms.
Figure 4:
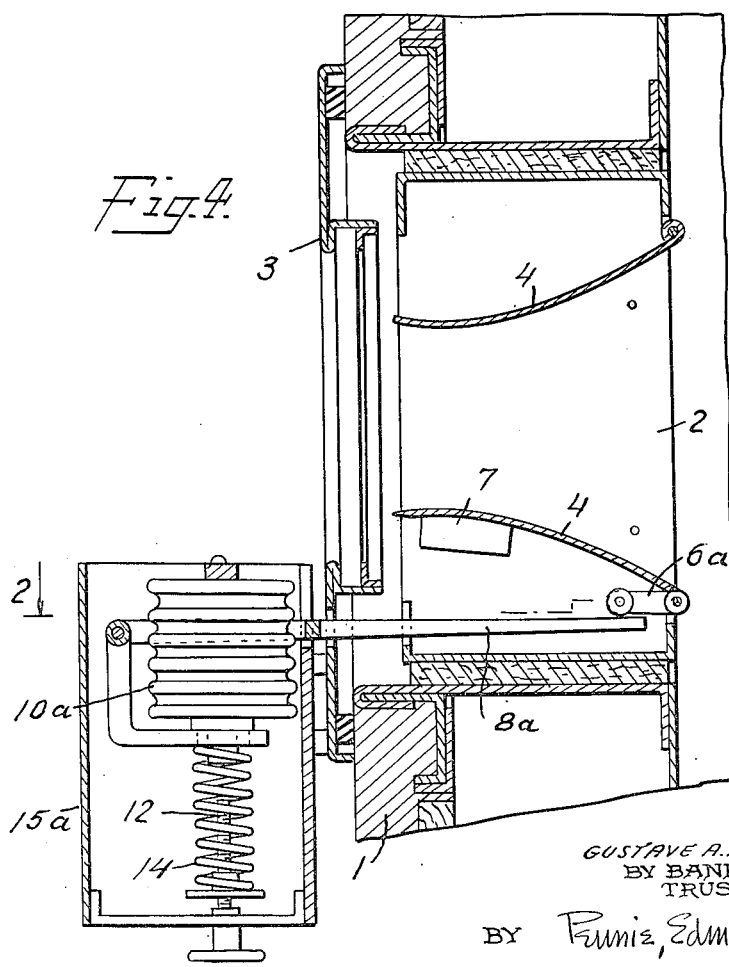
Fig. 4 is a similar view on line 4—4 of Fig. 2 of the cold air responsive mechanism.
Figure 7:
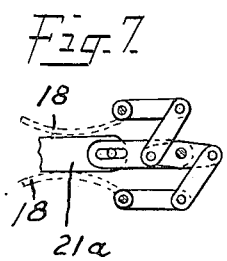

The above described apparatus may be used alone where artificial cooling in summertime is not desired. Where, however, it is desired to maintain a regulated temperature in summer as well as winter by means of cold air supplied through the same ducts, the main dampers are provided with an auxiliary operating mechanism, preferably located at the other side of the grill 3. This mechanism (see Figs. 2 and 4) comprises a main bellows 10a supported in a housing 15a and engaging at its lower end a bell crank 8a whose horizontal arm extends inwardly through a hole in the grill into position to engage the end of the crank arm 6a attached to the end of the operating shaft of the lower damper. The pivot of the bell crank 8a is positioned between the front wall of the bellows and the housing 15a. The vertical arm of the bell crank is provided with a rearwardly extending horizontal portion which engages the bottom of the bellows whereby the expansion of the bellows allows the damper to open and contraction of the bellows permits the spring 14 which engages the under face of the rearward extension of the bell crank 8a to close the main dampers. In the construction illustrated the thermostatic bellows which controls the position of the pilot dampers in the auxiliary duct 17a is connected to the dampers in such manner that the expansion of the thermostatic bellows due to a rise of temperature in a room tends to close the pilot dampers instead of open them, as in the case of the warm air responsive regulator. This reversal of movement is accomplished by reversing the pivots of the levers which transmit the motion of the bell crank 21a to the pilot dampers as shown by a comparison of Figs. 5, 6 and 7.

In the operation of the above described apparatus the room thermostat is set to maintain the pilot dampers partially open at the desired temperature, thereby allowing a partial flow of cool air from the main duct through the auxiliary duct across the bellows. If the temperature in the room rises the expansion of the thermostatic bellows tends to close the pilot dampers, thereby reducing the flow of cool air through the auxiliary duct with a consequent expansion of the main bellows which in turn causes the main damper to open further, thus allowing more cool air to enter the room. As will be understood, the reverse action takes place if the temperature in the room falls below the desired figure. When the same main dampers are provided with both the hot air responsive regulator and the cold air responsive regulator, neither interferes with the operation of the other.

Referring back to Fig. 3 which shows the hot air responsive mechanism, it will be assumed that the air flowing through the duct is cool air instead of the warm air to which the mechanism is responsive. The cool air used in temperature regulating systems is usually maintained around 60°, whereas the hot air for heating is maintained around 95° or 100°. The temperature of the duct air in the summertime is thus 35 to 40° cooler than the duct air to which the bellows is responsive in its normal operating range. The effect of this cool air as delivered through the auxiliary duct in the summertime causes the bellows 10 to contract to such an extent that the spring 14 moves the bell crank 8 to its fully open position, where it will remain so long as cool air is supplied to the main duct. In like fashion the apparatus which is responsive to cool air from the duct is rendered inoperative by the delivery of hot air to the duct. That is to say, the bellows 10a which is responsive to cool air of a temperature around 60° will when heated by hot air in the neighborhood of 95° or 100° so expand the main bellows as to turn the regulating bell crank to fully open position and maintain it there so long as hot air is supplied to the duct.

In Figs. 8 and 9 is shown a modified form of the apparatus wherein a single operating mechanism serves to regulate the damper for both summer and winter operation. As here shown the entire apparatus as provided for winter operation is employed with the parts unchanged save that instead of the single spring for opposing the movement of the main bellows 10, two springs 14b and 14c are employed. The spring 14b is of a strength to oppose the expansion of the bellows throughout the temperature range required for the apparatus in summer operation, that is, when the bellows is subjected to cold air from the auxiliary duct. The spring 14c is of a strength which, when added to that of the spring 14b, furnishes the opposition to the movement of the bellows required for winter operation, that is, when the bellows is subjected to the hot air from the auxiliary duct 17. As shown, the spring 14b is interposed between the extension 9 of the bell crank 8 and the collar 13 of the adjusting screw 12. The spring 14c surrounds the spring 14b and is seated against the bracket 11. The upper end of the spring 14b carries a collar 24 which in winter operation abuts against the extension 9 of the bell crank 8 to supplement the action of the spring 14b in opposing the expansion of the bellows. The collar 24 is integral with a depending sleeve 25 which at its lower end has a radially extending flange 26 to form a seat for an adjusting ring 27 by means of which the spring 14c may be held compressed so as not to engage the arm 9 when the apparatus is adjusted for summer operation. To this end the adjusting ring is provided with four pins 28 which project through inclined slots 29 in a ring 30 fixedly attached by a bracket 31 to the housing 15. The inclined slots 29 are provided at each end with notches to receive the pins and hold them against accidental displacement in both positions of adjustment. One of the pins 28 is longer than the others and projects through a slot in the front wall of the housing 15 and is provided with a knob 32 by means of which the ring 27 may be turned to shift the pins from the upper to the lower ends of the inclined slots, and vice versa, to render the spring 14c operative or inoperative, as desired.

When the ring is adjusted at the upper position in the inclined slot for winter operation the spring 14c augments the action of spring 14b, the two together operating in precisely the same manner as the single spring 14 previously described. When the apparatus is adjusted for summer operation the ring 27 is shifted to its lower position, thereby compressing the spring 14c and holding it out of contact with the arm 9 throughout the entire range of the operation of that arm, that is, throughout the movement of the arm from fully open to fully closed position of the main dampers. When so adjusted the apparatus operates precisely as the previously described separate unit for winter operation. Assuming the room temperature to rise above that desired, the room thermostat which is identical with that employed for winter operation with the link arrangement shown in Fig. 6 will shift the pilot dampers to a further open position, thus increasing the quantity of cold air contacting the main bellows 10, causing that bellows to contract, thus shifting the bell crank 8 so that the weight 7 can open the main dampers to a greater extent, allowing more cold air to enter the room and reduce the temperature. The reduction in room temperature will gradually effect a reverse operation until equilibrium is reached wherein the room temperature remains substantially constant at the value for which the room thermostat is set.

While there have been shown and described in the accompanying drawings and the foregoing specification the preferred embodiments of the invention, it is understood that the structure may be variously modified without departing from the spirit of the invention as defined in the appended claims.

What is claimed is:

1. In an apparatus for controlling the flow of air from a duct into an enclosure, a damper for varying the exit opening from said duct, a motor for said damper operated by heat derived from the air in said duct when the temperature of said air is greater than the temperature of the surrounding atmosphere, and a second motor for said damper operated by heat derived from the atmosphere surrounding said motor when the temperature of the surrounding atmosphere is greater than the temperature of the air in said duct said motors being independently connected to said damper for independent operation.

2. In an apparatus for controlling the flow of air from a duct into an enclosure, a main damper for varying the exit opening from said duct, a motor for operating said damper comprising an expansible vessel containing a volatile liquid, a branch duct leading from said main duct to a position adjacent said motor, a control damper in said branch duct, means for opening said control damper as the temperature rises in said enclosure, a second motor for operating said main damper comprising an expansible vessel containing a volatile fluid, a second branch duct leading from said main duct to a position adjacent said second motor, a second control damper in said branch duct and means for opening said second control damper as the temperature falls in said enclosure, said second motor being inoperative when the duct temperature exceeds the temperature in the enclosure.

3. In an apparatus for controlling the flow of air from a duct into an enclosure, a damper for varying the exit opening from said duct, and two motors, each comprising an expansible chamber containing a volatile fluid, for operating said damper by heat derived from said duct, one of said motors being operative when the temperature of the air in the duct is greater than the temperature of the atmosphere in the enclosure, the other motor being operative when the duct temperature is lower than the temperature in the enclosure said motors being independently connected to said damper for independent operation.

References Cited in the file of this patent

UNITED STATES PATENTS

| | | |
|---|---|---|
| 1,181,443 | Fulton | May 2, 1916 |
| 1,917,880 | Frantz et al. | July 11, 1933 |
| 2,238,807 | Dube | Apr. 15, 1941 |
| 2,487,367 | Peple | Nov. 8, 1949 |
| 2,523,497 | Copping | Sept. 26, 1950 |
| 2,537,315 | Newton | Jan. 9, 1951 |